(12) United States Patent
Forsberg

(10) Patent No.: US 12,436,785 B2
(45) Date of Patent: Oct. 7, 2025

(54) FRAMEWORK TO AUTOMATE AND VERIFY THE LOCALIZATION OF NON-NATIVE LANGUAGES IN A CLOUD BASED APPLICATION

(71) Applicant: Hewlett Packard Enterprise Development LP, Spring, TX (US)

(72) Inventor: Michael Karl Forsberg, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 211 days.

(21) Appl. No.: 18/498,274

(22) Filed: Oct. 31, 2023

(65) Prior Publication Data

US 2025/0138854 A1    May 1, 2025

(51) Int. Cl.
*G06F 40/51* (2020.01)
*G06F 9/451* (2018.01)
*G06F 40/58* (2020.01)

(52) U.S. Cl.
CPC .............. *G06F 9/454* (2018.02); *G06F 40/51* (2020.01)

(58) Field of Classification Search
CPC ........... G06F 9/454; G06F 40/51; G06F 40/58

USPC ..................................................... 704/2, 5, 8
See application file for complete search history.

(56) References Cited

U.S. PATENT DOCUMENTS

2018/0300218 A1\* 10/2018 Lipka ..................... G06F 40/58

\* cited by examiner

*Primary Examiner* — George C Monikang
(74) *Attorney, Agent, or Firm* — Slater Matsil, LLP

(57) ABSTRACT

In certain embodiments, a method includes obtaining a cloud-based application; extracting native language files and internationalization keys that correspond to the native language files from the cloud-based application; storing the native language files and the keys in a translation data repository accessible by a translation service; detecting non-native language files corresponding to the native language files in the translation data repository; performing an initial check on the non-native language files; generating, when the initial check passes, a test build of the cloud-based application; deploying the test build to a test environment in a cloud infrastructure to have a first validation performed by the translation service and a second validation performed by a cloud-based application provider; and generating, when the first validation and the second validation pass, a production build of the cloud-based application comprising the non-native language files.

20 Claims, 4 Drawing Sheets

FRAMEWORK TO AUTOMATE AND VERIFY THE LOCALIZATION OF NON-NATIVE LANGUAGES IN A CLOUD BASED APPLICATION

BACKGROUND

User interfaces for cloud applications are often rendered using the native language of the entity providing the software. Such applications are often used in any number of locations where the local language is not the same as the native language of the entity providing the application. Therefore, it may be useful to translate the text of the user interface into any number of languages. However, such translations often require much manual effort, and may be difficult to validate.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION OF ILLUSTRATIVE EMBODIMENTS

Figure 1:
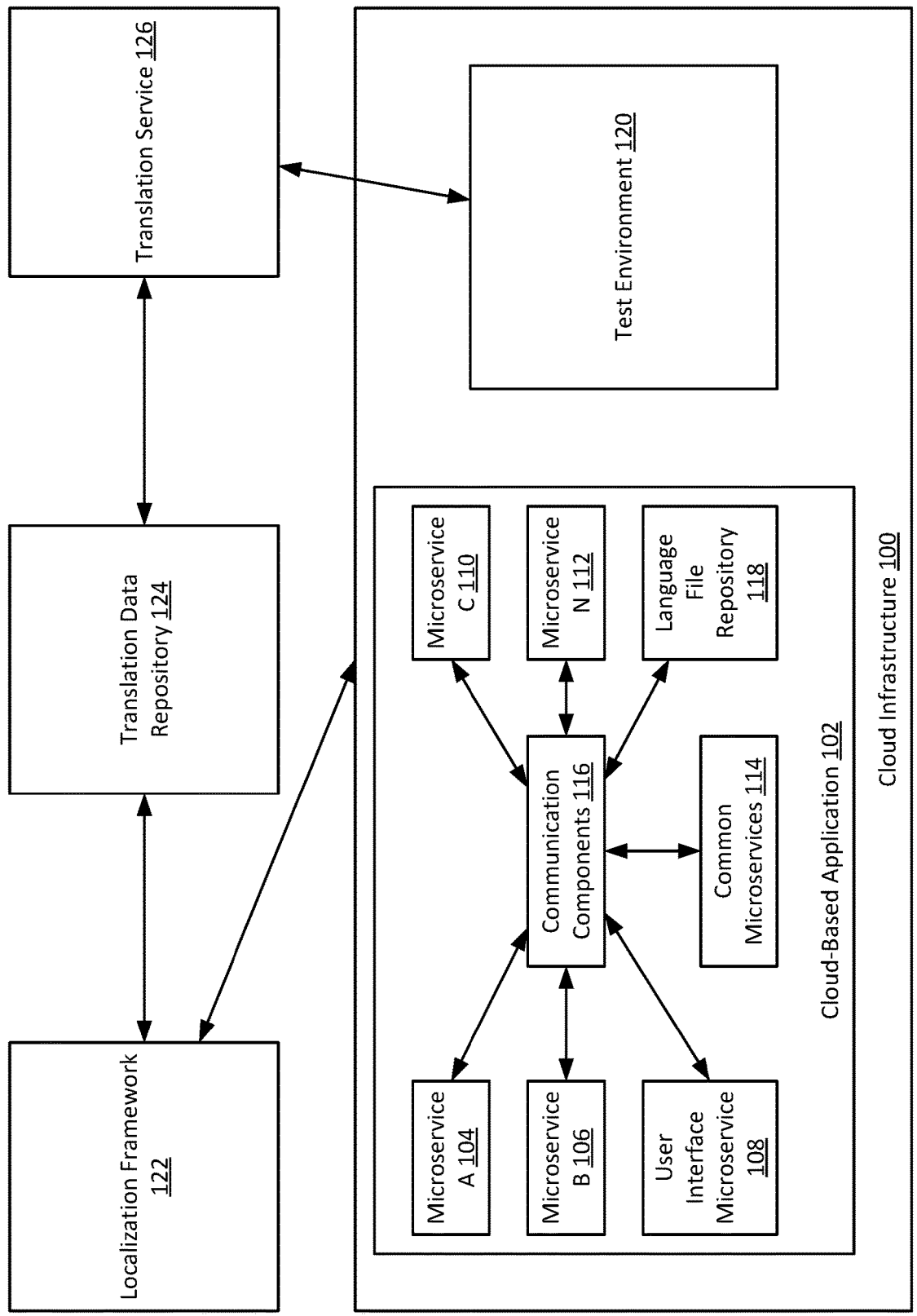
FIG. 1 illustrates a block diagram of an example system for implementing a localization framework to automate and verify the localization of non-native languages in a cloud-based application in accordance with one or more embodiments disclosed herein.

Cloud-based applications are often structured as any number of microservices. Such applications often display text to users in a user interface of the application in order to convey information. Such text is generally in the native language of the entity providing the application (e.g., an entity in the United States of America may produce an application with text in the English language). Producing versions of a user interface in a cloud-based application that are translated into multiple languages includes translating text of the native language files, integrating the translated files with the product, and visually inspecting the product for errors. Many cloud-based architectures exacerbate this complexity by having multiple code repositories for different aspects of the application. With such an architecture, each repository requires native and non-native language files, which are then integrated into a cohesive product for testing and production. The additional complexity of integrating these multiple languages into the application may result in a sizeable manual effort.

The process of making a cloud-based application ready for being rendered using both native and non-native languages is referred to as internationalization. To perform internationalization, the human-readable text strings of the user interface are replaced with markers or variables. The original native language text is then collected into a resource bundle of all native language strings, which may include any number of files, each including a portion of the native language text of the application. During runtime for a user that views the application in the native language, the user interface's presentation layer replaces the markers with the correct strings from the native language files.

In order to support multiple languages or locales, the set of native language text strings are translated and bundled into resource bundles matching the native language bundle. This process may be referred to as localization.

In cloud-based architectures there are often any number of microservices, each of which must be internationalized, and also have multiple non-native language bundles in addition to the native language bundle. Often, these microservices are kept in disjoint source code repositories, which increases the burden of localization. Thus, for a single microservice in a cloud based application, the total number of files to maintain is equal to n+1 where n is the number of languages. The additional plus one is for the internationalized set of keys. Because most cloud base products have m microservices, the total number of files is m*(n+1).

Generally, cloud-based application providers do not often have trained translators on staff. Therefore, the task of translating the native (or source) language files into other languages is performed by a third party.

In some instances, the third party translators may be granted access to the entire code base to access the native language files that are to be translated. Such broad access allows the translators to access all the text needed for translation. The third party may then directly integrate the non-native language files into the application. However, many cloud-based application providers do not wish to provide access to the entire code base for entities outside the cloud-based application provider due to security concerns.

Another option is to package the native language files into a bundle and provide the bundle to the entity performing the translation. After some time, the translators will complete their work, and provide the cloud-based application provider with the non-native language files that correspond to the native language files. This process may be time consuming and may occur away from the source of the data (e.g., the cloud-based application provider). During the time period when the translation is being performed, the cloud-based application provider may be making changes to the native language files without informing the translators. Such activity may result in the newly translated files mismatching the now changed native language files. Additionally, the cloud-based application provider must reintegrate the non-native text into the product. This process may be labor intensive, and may introduce errors when reintegrating the non-native translated text.

In order to address at least the aforementioned problems with providing cloud-based applications capable of being rendered in a native language and any number of non-native languages, embodiments disclosed herein provide a framework for providing native language files of a cloud-based application to third-party translators without providing the third-party translators with access to the source code of the cloud-based application. Additionally, in one or more embodiments, the framework automates integration of the translated non-native language files into a test version of the cloud-based application so that the cloud-based application provider and the third-party translator may verify the cloud-based application before a production version of the cloud-based application is produced. In one or more embodiments, the framework also automates a process for making third-party translators aware of changes to the native language files when the cloud-based application provider changes such files before the translation is completed.

In one or more embodiments, a cloud-based application provider creates, generates, or otherwise obtains an initial version of a cloud-based application, which may include any number of separate microservices, and that has been internationalized, as discussed above. In one or more embodiments, the internationalized version of the cloud-based application, including the native language files and the internationalization keys, is provided to a localization framework. In one or more embodiments, the localization framework extracts the native language files and the internationalization keys from the cloud-based application, and transmits the native language files in a native language bundle, and the internationalization keys, to a third-party data repository that is accessible by a third-party translation service.

In one or more embodiments, a third-party translation service accesses the native language bundle, and initiates translation of the native language text in the native language files into non-native language text, stored in non-native language files that correspond to the native language files. In one or more embodiments, if there are no changes made by the cloud-based application provider to the native language files of the cloud-based application during the period of time during which the translation is occurring, the third-party translation service may complete the translation of the native language text in the native language files to non-native language text in corresponding non-native language files. In one or more embodiments, the internationalization keys are used by the third-party translation service to identify mappings between the keys and the language files In one or more embodiments, in some scenarios, the cloud-based application provider may continue to perform development of the cloud-based application while the translation is occurring. In one or more embodiments, such development may include making changes to the native language text of the cloud-based application. In one or more embodiments, when such changes to the native language text are made during the period of time that the translation is occurring, the localization framework may detect that the changes have occurred, and obtain updated native language files that include the changes. In one or more embodiments, the localization framework then sends a notification that the changes have occurred to the third-party translation service, and replaces the previous versions of the native language files in the third-party data repository with the updated native language files that include the changes. In one or more embodiments, the third-party translation service completes translation of the native language text in the native language files to non-native language text in corresponding non-native language files, including the updated native language files that include changed native language text that were automatically provided by the localization framework.

In one or more embodiments, the localization framework monitors the third-party data repository, and detects when the translated non-native language files are all present. In one or more embodiments, the localization framework obtains the non-native language files from the third-party data repository, and performs an initial check of the non-native language files. In one or more embodiments, the native language files that are provided to the third-party translation service via the third-party database each include a parameter count. In one or more embodiments, a parameter is a portion of text in the native language file that the cloud-service application provider does not want to be translated. For example, native language text strings may include variables that the cloud-based application provider does not want translated, such as the variable "A" in a text string that says "Server A is disconnected". In that scenario, the words server, is, and disconnected would require translation, but the parameter A would not. In one or more embodiments, each such parameter in a native language file contributes to the parameter count for that file. Additionally, the localization framework may provide a file that includes a list of other words (which may be referred to as reserved words) that the cloud-based application provider does not want translated, such as, for example, proprietary names of products (e.g., DL380 G12), product lines (e.g., ProLiant servers), etc. In one or more embodiments, the initial check of performed on the non-native language files by the localization framework includes verifying that the parameter count in the non-native language files matches the expected parameter count of the corresponding native language files, and also performs a syntax check to ensure that instances of the reserved words are not translated. In one or more embodiments, the order of the parameters in a native language file is not considered, as the order of the parameters in the non-native language files may change depending on the language into which the native language is being translated due to difference between the native language and the non-native language.

In one or more embodiments, if the initial check fails, the failing results are provided to the third-party translation service so that the third-party translation service may update the non-native language files to address whatever errors were found during the initial check. In one or more embodiments, when the initial check passes, the localization framework obtains the non-native language files from the third-party data repository and automatically integrates the non-native language files into a test build of the cloud-based application, which is deployed in a test location in a cloud infrastructure environment. In one or more embodiments, the cloud-based application provider and the third-party translation service each have access to the test build of the cloud-based application. In one or more embodiments, each party then performs a visual inspection of the test build. As an example, the visual inspection performed by the third-party translation service may include seeing the translated text in the context of how a user of the cloud-based application would see the translated text, and determine if the translation really says what the third-party translation service believes that it should say in that context. As another example, the visual inspection performed by the cloud-based application provider may include seeing the translated text in the context of the cloud-based application, and determining whether the text seems to appear in the correct locations, is rendered appropriately, etc.

In one or more embodiments, if the visual inspection by either party fails, the third-party translation service may perform additional translation work to correct whatever issues were found during the visual inspection. In one or more embodiments, when both parties approve of the test build of the cloud-based application with the translations, each party provides the localization framework with an approval of the test build. In one or more embodiments, in response to the approvals, the localization framework updates the microservices of the cloud-based application such that the microservices will use the non-native language files as needed as the cloud-based application is accessed and used by speakers of the non-native language Certain embodiments of this disclosure may provide a framework that allows for providing native language files of a cloud-based application to a third-party translation service without providing the source code of the application by providing only the native language files with parameter counts, the internationalization keys, and a file that includes a list of reserved words to a third-party data repository that is accessible to the third-party translation service. The framework also automates providing changes to native language files made during the period of time the translation is occurring, performing an initial check on the translated non-native language files using the parameter counts of the native language files and the list of reserved words, generating and deploying to a test location in the cloud a test build of the cloud application once the initial check passes, and producing a production version of the cloud-based application once the cloud-based application provider and the third-party translation service approve of the test build.

FIG. 1 illustrates a block diagram of an example system for implementing a localization framework to automate and verify the localization of non-native languages in a cloud-based application in accordance with one or more embodiments disclosed herein. As shown in FIG. 1, the system may include a cloud infrastructure 100. The cloud infrastructure 100 may include any number of microservices, such as, for example, microservice A 104, microservice B 106, microservice C 110, microservice N 112, a user interface microservice 108, one or more common microservices 114, and nay number of communication components 116. The cloud infrastructure 100 may also include a test environment 120. The system may also include a localization framework 122, a translation data repository, and a translation service. Each of these components is described below.

In one or more embodiments, the cloud infrastructure 100 is a collection of any number of computing devices and other components in which a cloud computing environment is deployed, and which may host any number of cloud-based applications (e.g., the cloud-based application 102), as-a-Service (aaS) products (e.g., Software aaS (SaaS), Infrastructure aaS (IaaS), Platform aaS (PaaS), Storage aaS (STaaS), etc.). In one or more embodiments, as used herein, a computing device may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs) (not shown)), one or more physical interfaces (e.g., network ports, storage ports), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., switch, router, multi-layer switch, etc.), a virtual machine (executing using underlying physical hardware), a virtualized computing environment, a logical container (e.g., for one or more cloud-based applications), one or more container pods, an Internet of Things (IoT) device, an array of nodes of computing resources, a supercomputing device, a data center or any portion thereof, and/or any other type of computing device with the aforementioned requirements. In one or more embodiments, any or all the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 4 and described below. The cloud infrastructure 100 may include any number and/or type of such computing devices in any arrangement and/or configuration without departing from the scope of embodiments disclosed herein.

In one or more embodiments, the storage and/or memory of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage and/or memory of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The cloud infrastructure 100 may include any number of computing devices, any number of which may be collectively considered a computing device as used herein. All or any portion of the computing devices may be the same type or be different types of computing devices.

In one or more embodiments, all or any portion of the cloud infrastructure 100 may managed, at least in part, by a container platform (not shown), such as, for example, Kubernetes. In one or more embodiments, a container platform includes a control plane (not shown). A control plane of a container platform may include various components for managing the cloud infrastructure 100 (e.g., one or more API servers, controllers, schedulers, etc.). The control plane may, for example, be implemented on one or more master nodes, each of which may be a computing device (discussed above).

In one or more embodiments, the cloud infrastructure 100 may host any number of cloud-based applications (e.g., the cloud-based application 102), which may be implemented using a microservice architecture that includes any number of microservices (e.g., microservice A 104, microservice B 106, microservice C 110, microservice N 112), as well as various other microservices (e.g., a user interface microservice 108, any number of common microservices 114, etc.) and various communication components 116 that allow the various microservices to interact with other microservices, other parts of the cloud infrastructure 100, and/or entities and/or device outside the cloud infrastructure 100.

In one or more embodiments, a microservice (e.g., 104, 106, 108, 112, 112, 114) may be implemented using any number of containers, container pods, etc. Each microservice (e.g., 104, 106, 108, 112, 112, 114) may implement a particular service component that makes up part of an overall cloud-based application 102 deployed in the cloud infrastructure 100.

In one or more embodiments, the common microservices 114 may be a set of services that are common to all or any portion of the other microservices (e.g., 104, 106, 108, 110, 112, 114) of the cloud-based application 102 deployed using a microservice architecture in the cloud infrastructure 100. Examples of common microservices include, but are not limited to, database services, authorization services, workflow orchestration microservices, auditing microservices, management microservices, etc.

In one or more embodiments, the cloud infrastructure 100 includes the communication components 116. In one or more embodiments, as used herein, communication components 116 include physical and/or logical devices and/or components that implement any number of communication protocols that allow microservice communication. As an example, various communication protocols may include, but are not limited to, Representational State Transfer (REST) protocol, remote procedure call (RPC) frameworks (e.g., gRPC), Kafka protocol, etc., as well as other underlying protocols that may be used in communications, such as hypertext transfer protocol (HTTP), transmission control protocol (TCP), user datagram protocol (UDP), etc. Such protocols may be used for communicating data, commands, etc.

In one or more embodiments, the user interface microservice 108 may be a microservice that provides a user interface of any type (e.g., graphical, command line, etc.) for user of an application deployed as microservices of a microservice architecture. In one or more embodiments, the user interface microservice may be all or any portion of a user interface that a user accesses to interact with the cloud-based application. As such, in one or more embodiments, the user interface microservice 108, and/or any other portion of a user interface of the cloud-based application 102, may display text to a user.

In one or more embodiments, the cloud-based application 102 has been internationalized. In one or more embodiments, a process of making the cloud-based application 102 ready for being rendered using both native and non-native languages is referred to as internationalization. In one or more embodiments, to perform internationalization, the human-readable strings of the user interface are replaced with markers or variables, which may be referred to herein as internationalization keys. In one or more embodiments, the original native language text is then collected into a resource bundle of all native language strings, which may include any number of files, each including a portion of the native language text of the cloud-based application 102. In one or more embodiments, during runtime for a user that views the application in the native language, the user interface's presentation layer replaces the markers (e.g., internationalization keys) with the correct strings from the native language files. In one or more embodiments, in order to support multiple languages or locales, the set of native language text strings are translated and bundled into resource bundles matching the native language bundle. This process may be referred to as localization.

In one or more embodiments, native language files, non-native-language files, and internationalization keys are stored in the cloud infrastructure 100 in the language file repository 118. In one or more embodiments, the language file repository 118 is a data repository of any type capable of storing information. In one or more embodiments, the language file repository 118 includes one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, a data repository may include multiple different storage units and/or devices. The multiple different storage units and/or devices may or may not be of the same type or located at the same physical location. In one or more embodiments, during runtime, based at least in part on the language in which a user of the cloud-based application 102 elects to view text of the user interface of the cloud-based application 102, when the cloud-based application 102 encounters an internationalization key, the cloud-based application 102 obtains from the language file repository 118 the language files in the language of the user corresponding to the encountered one or more internationalization keys, and uses the language files to render the text of the user interface in the chosen language of the user.

Although FIG. 1 shows a particular set of microservices arranged in a particular manner to form the cloud-based application 102, the cloud infrastructure 100 may include any microservice architecture with any number of microservices arranged and configured in any way as a cloud-based application without departing from the scope of embodiments disclosed herein. Such microservice architectures may be used to implement any type of cloud-based application, any number of cloud-based applications, and/or any other services (e.g., aaS products). Additionally, all or any portion of any of the aforementioned devices, components, etc. (e.g., computing devices, servers, network devices, storage devices, container platforms, containers, container pods, microservices, virtual machines, etc.), in any combination, may be referred to herein as one or more components of a cloud infrastructure, and may serve as portions of, or host components of, the cloud-based application 102.

In one or more embodiments, the cloud infrastructure 100 includes the test environment 120. In one or more embodiments, the test environment is any collection of any quantity of the any of the aforementioned resources, devices, components, services, etc. that may exist in the cloud infrastructure 100. In one or more embodiments, the test environment 120 is intended for deployment of test builds (e.g., pre-production builds) of cloud-based applications to that such cloud-based applications may be tested before being released to end users (e.g., as the cloud-based application 102). Although FIG. 1 shows the test environment 120 in the same cloud infrastructure 100 as the cloud-based application 102, the test environment 120 may be in a separate cloud infrastructure without departing from the scope of embodiments disclosed herein.

In one or more embodiments, the system includes the localization framework 122. In one or more embodiments, the localization framework is any hardware, software, firmware, or any combination thereof that is configured to automate and verify a localization process for translating native language files to non-native languages, perform an initial check of translated non-native language files, test a test build using the non-native language files, and make the non-native language files available in a production build of a cloud-based application (e.g., the cloud-based application 102) when testing of the test build is successful. As an example, the localization framework 122 may be implemented on any number of computing devices (described above). The localization framework 122 may be all or any portion of an apparatus for performing all or any portion of the embodiments disclosed herein. In one or more embodiments, the localization framework is operatively connected to the cloud infrastructure 100, and, thus, may access components therein such as the language file repository 118, the test environment, 120, etc.

In one or more embodiments, the localization framework 122 is operatively connected to the translation data repository 124. In one or more embodiments, the translation data repository is a data repository (described above) of any type that is configured to receive and store native language files, internationalization keys, reserved word files, and translated non-native language files. Although FIG. 1 shows a single translation data repository 124, the system may include any number of translation data repositories operatively connected to the localization framework 122 without departing from the scope of embodiments disclosed herein.

In one or more embodiments, the translation data repository 124 is accessible to the localization framework 122 and to the translation service 126 (discussed below). In one or more embodiments, the translation data repository 124 receives native language files (which include parameter counts), internationalization keys, and reserved word files from the localization framework. In one or more embodiments, as discussed above a cloud-based application provider creates, generates, or otherwise obtains an initial version of a cloud-based application (e.g., the cloud-based application 102), which may include any number of separate microservices, and that has been internationalized, as discussed above. In one or more embodiments, the internationalized version of the cloud-based application 102, including the native language files and the internationalization keys, is provided to a localization framework 122. In one or more embodiments, the localization framework 122 extracts the native language files and the internationalization keys from the cloud-based application, and transmits the native language files in a native language bundle, and the internationalization keys, to the translation data repository 124 that is accessible by the translation service 126.

In one or more embodiments, the native language files that are provided to the translation service 126 via the translation data repository 124 database each include a parameter count. In one or more embodiments, a parameter is a portion of text in the native language file that the cloud-service application provider does not want to be translated. For example, native language text strings may include variables that the cloud-based application provider does not want translated, such as the variable "A" in a text string that says "Server A is disconnected". In that scenario, the words server, is, and disconnected would require translation, but the parameter A would not. In one or more embodiments, each such parameter in a native language file contributes to the parameter count for that file.

Additionally, in one or more embodiments, the localization framework 122 may provide a file that includes a list of other words (which may be referred to as reserved words) that the cloud-based application provider does not want translated, such as, for example, proprietary names of products (e.g., DL345 G11, Greenlake, etc.), product lines (e.g., ProLiant servers), etc.

In one or more embodiments, the localization framework 122 is configured to perform an initial check of performed on the non-native language files after translation of the native language files to non-native language files. In one or more embodiments, the initial check includes verifying (e.g., by performing a comparison) that the parameter count in the non-native language files matches the expected parameter count of the corresponding native language files, and also performs a syntax check to ensure that instances of the reserved words are not translated. In one or more embodiments, the order of the parameters in a native language file is not considered, as the order of the parameters in the non-native language files may change depending on the language into which the native language is being translated due to difference between the native language and the non-native language.

In one or more embodiments, the system also includes the translation service 126. In one or more embodiments, the translation service 126 is any entity capable of translating language files from one language to one or more other languages. The translation service may include human translators, machine translators, or any combination thereof. In one or more embodiments, the translation service 126 is operatively connected to the translation data repository 124 and to the test environment 120, and may access both. Although FIG. 1 shows a single translation service 126, the system may include any number of translation services without departing from the scope of embodiments disclosed herein.

In one or more embodiments, the translation service 126 is configured to access the native language bundle of native language files (which it may be notified about by the localization framework 122), and initiates translation of the native language text in the native language files into non-native language text, stored in non-native language files that correspond to the native language files.

In one or more embodiments, if there are no changes made by the cloud-based application provider to the native language files of the cloud-based application 102 during the period of time during which the translation is occurring, the translation service 126 may complete the translation of the native language text in the native language files to non-native language text in corresponding non-native language files. In one or more embodiments, the internationalization keys are used by the translation service 126 to identify mappings between the keys and the language files In one or more embodiments, in some scenarios, the cloud-based application provider may continue to perform development of the cloud-based application 102 while the translation is occurring. In one or more embodiments, such development may include making changes to the native language text of the cloud-based application 102. In one or more embodiments, when such changes to the native language text are made during the period of time that the translation is occurring, the localization framework 122 may detect that the changes have occurred, and obtain updated native language files that include the changes.

In one or more embodiments, the localization framework 122 then sends a notification that the changes have occurred to the translation service 126 (via the translation data repository 124 or using any other suitable means of notification), and replaces the previous versions of the native language files in the translation data repository 124 with the updated native language files that include the changes. In one or more embodiments, the translation service 126 completes translation of the native language text in the native language files to non-native language text in corresponding non-native language files, including the updated native language files that include changed native language text that were automatically provided by the localization framework 122.

In one or more embodiments, after the translation service 126 translates the native language files and/or updated native language files into a corresponding set of non-native language files, the localization framework 122 is configured to detect the existence of the translated non-native language files on the translation data repository, perform an initial check of the non-native language files, and generate a test build of the cloud application when the initial check passes. In one or more embodiments, the provider of the cloud-based application 102 and the translation service 126 may inspect the test build to determine whether the result is acceptable (e.g., perform acceptance testing). When the test build is accepted by both parties, the localization framework 122 may be notified, and may use the non-native language files to generate a production build of the cloud-based application 102 (e.g., by making the non-native language files available in the language file repository 118 of the cloud-based application 102). The initial check, testing of the test build, and generation of the production build of the cloud-based application 102 are discussed further in the description of FIG. 2, below.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all, or any portion of the functionality performed by the all or any portion of the components shown in FIG. 1. Accordingly, embodiments disclosed herein should not be limited to the configuration of components shown in FIG. 1.

Figure 2:
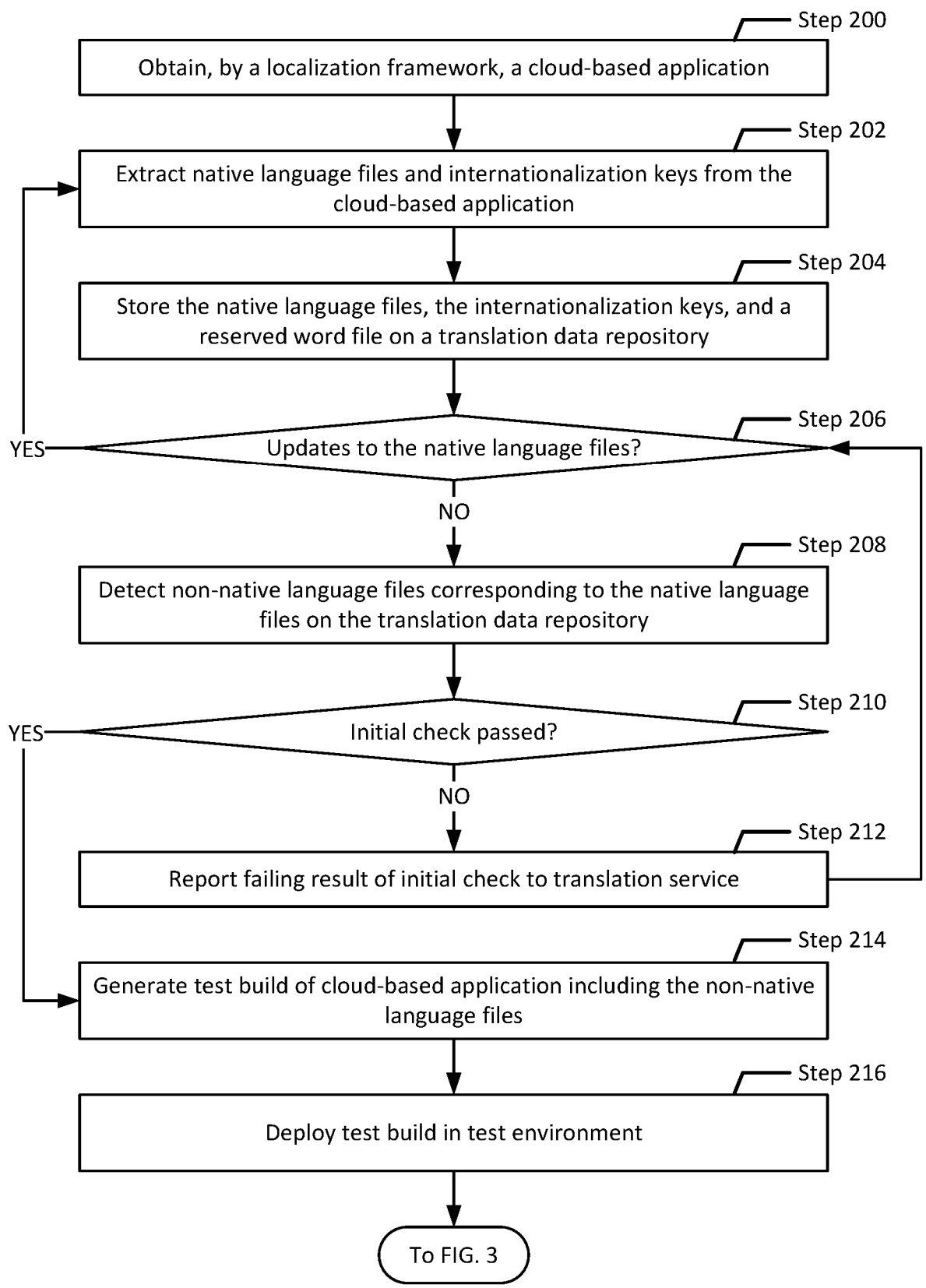
FIG. 2 illustrates an overview of an example method for performing a localization of a cloud-based application in accordance with one or more embodiments disclosed herein.

FIG. 2 illustrates an overview of an example method for performing a localization of a cloud-based application in accordance with one or more embodiments disclosed herein. All or any portion of the method shown in FIG. 2 may be performed, for example, by a localization framework (e.g., the localization framework 122 shown in FIG. 1 and described above).

Figure 3:
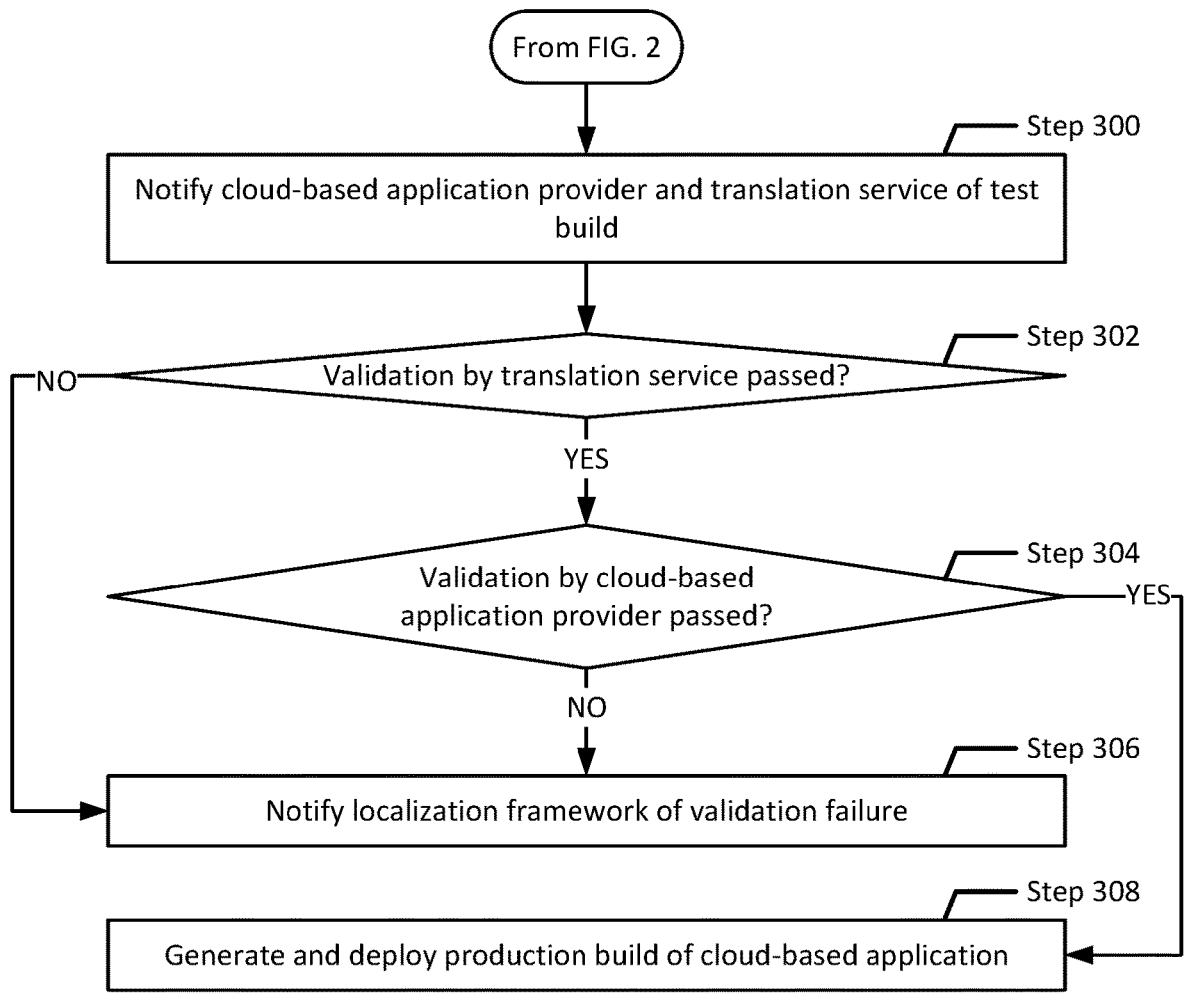
FIG. 3 illustrates an overview of an example method for validating a test build of a cloud-based application and deploying a production build of the cloud-based application in accordance with one or more embodiments disclosed herein.

While the various steps in the flowchart shown in FIG. 2 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2 and/or FIG. 3.

In Step 200, the method includes obtaining a cloud-based application (e.g., the cloud-based application 102 of FIG. 1). The cloud-based application may be obtained, for example, by a localization framework (e.g., the localization framework 122 of FIG. 1). In one or more embodiments, a cloud-based application provider creates, generates, or otherwise obtains an initial version of a cloud-based application, which may include any number of separate microservices. Obtaining the cloud-based application may include obtaining code, files, etc. of the cloud-based application. The cloud-based application may be obtained when it is provided to the localization framework by the cloud-based application provider. Additionally, or alternatively, all or any portion of obtaining the cloud-based application by the localization framework may be automated. For example, when a production version of a cloud-based application is deployed in a cloud infrastructure or otherwise made available to users, the localization framework may be configured to detect the deployment, and obtain the cloud-based application.

In one or more embodiments, the cloud-based application is internationalized. As such, the cloud-based application, may include native language files, internationalization keys corresponding to the native language files, and one or more reserved word files. In one or more embodiments, the native language files include native language text. As discussed above, a native language may be native relative to the entity that provides the cloud-based application (e.g., Japanese for a Japan-based cloud application provider). The native language files may each include any amount of native language text, may each correspond to one or more locations in a user interface, and may be used when the native language text is to be rendered in the user interface. As an example, as a cloud-based application executes, a user may interact with the cloud-based application using the user interface. As the user interface executes, the cloud-based application may encounter an internationalization key, and replace the internationalization key with native language text from a native language file corresponding to the internationalization key.

In Step 202, the method includes extracting the native language files and the internationalization keys from the cloud-based application. As an example, the native language files and the internationalization keys may be extracted from the cloud-based application by a localization framework (e.g., the localization framework 122 of FIG. 1). In one or more embodiments, all or any portion of the native language files may include a parameter count, which is a count of the number of parameters included in the text of the native language file that are not to be translated. The localization framework may also extract one or more reserved word files, or such reserved word files may be provided to the localization framework separately. In one or more embodiments, as discussed above in the description of FIG. 1, a reserved word file is a file that lists a set of words, phrases, etc. that are not to be translated.

In Step 204, the method includes storing the native language files, the internationalization keys, and the one or more reserved word files on a translation data repository (e.g., the translation data repository 124 of FIG. 1). As an example, the native language files, the internationalization keys, and the one or more reserved word files may be stored on the translation data repository by a localization framework (e.g., the localization framework 122 of FIG. 1). In one or more embodiments, storing the native language files, the internationalization keys, and the one or more reserved word files on the translation data repository may cause a translation service to automatically be notified of the new files (e.g., due to a monitoring agent, a push notification, etc.) and/or the localization framework may separately notify that the files are present and ready for translation. In one or more embodiments, at this point, in response to the notification, the translation service begins translation of the text of the native language files into one or more non-native languages, which are any languages other than the native language.

In Step 206, the method includes making a determination as to whether there are any updates to the native language files of the cloud-based application while the translation is being performed. As an example, the determination may be made by a localization framework (e.g., the localization framework 122 of FIG. 1). In one or more embodiments, in some scenarios, the cloud-based application provider may continue to perform development of the cloud-based application while the translation is occurring. In one or more embodiments, such development may include making changes to the native language text of the cloud-based application. In one or more embodiments, when such changes to the native language text (and, thus to the corresponding native language files) are made during the period of time that the translation is occurring, the localization framework may detect that the changes have occurred. As an example, the localization framework may be configured to monitor a language file repository (e.g., the language file repository 118 of FIG. 1) to determine if any native language files therein are updated while the translation is being performed. In one or more embodiments, if no updates are detected, the method proceeds to Step 208. In one or more embodiments, if one or more updates are detected, the method returns to Step 202, and the localization framework obtains (e.g., extracts) updated native language files, and possibly internationalization keys, that include the changes. In one or more embodiments, the localization framework then sends a notification that the changes have occurred to the translation service, and replaces the previous versions of the native language files in the translation data repository with the updated native language files that include the changes.

In Step 208, the method includes detecting non-native language files corresponding to the native language files on the translation data repository. As an example, a localization framework (e.g., the localization framework 122 of FIG. 1) may be configured to monitor the translation data repository, and determine when a non-native language file is present corresponding to each native language file stored on the translation data repository in Step 204.

In Step 210, the method includes making a determination as to whether an initial check passes. In one or more embodiments, an initial check includes verifying (e.g., by performing a comparison) that the parameter count in the non-native language files matches the expected parameter count of the corresponding native language files. In one or more embodiments, the initial check also includes performing an automated syntax check to ensure that instances of reserved words from the one or more reserved work files are not translated, which may be referred to as a reserved word check. As an example, the initial check may be performed automatically by a localization framework (e.g., the localization framework 122 of FIG. 1) in response to the detection of the non-native language files in Step 208. In one or more embodiments, if the initial check passes, the method proceeds to Step 214. In one or more embodiments, if the initial check fails, the method proceeds to Step 212.

In Step 212, the method includes reporting the failing result of the initial check to the translation service. As an example, the localization framework may provide a report of the failure to the translation service. In one or more embodiments, the report may include any details regarding the failure, such as, for example, which non-native language files failed the parameter count check, what reserved words were erroneously translated, etc. The report may be provided to the translation service using any suitable technique for conveying information (e.g., by storing the report on the translation data repository, sent over a network, etc.). In one or more embodiments, sending the report to the translation service causes the translation service to resume performing translation to address the issues causing the failure of the initial check, and the method returns to Step 206, where the localization framework monitors for updates to the native language files while the translation is occurring.

In Step 214, the method includes generating a test build of the cloud-based application. In one or more embodiments, the localization framework automatically generates the test build in response to the pass of the initial check. In one or more embodiments, generating a test build includes producing a test version of a cloud-based application, which may include, but is not limited to: compiling code (e.g., of various microservices); configuring a container platform; configuring containers; configuring pods; configuring components of a cloud infrastructure; storing the native language files, non-native language files, and internationalization keys in one or more appropriate data repositories; etc.

In Step 216, the method includes deploying the test build in a test environment (e.g., the test environment 120 of FIG. 1). As an example, the test build may be automatically deployed in the test environment by the localization framework after generation of the test build. In one or more embodiments, deploying the test build in the test environment includes preparing the test environment to be accessed by the cloud-based application provider and the translation service. In one or more embodiments, after Step 216, the method proceeds to the Steps shown in FIG. 3.

FIG. 3 illustrates an overview of an example method for validating a test build of a cloud-based application and deploying a production build of the cloud-based application in accordance with one or more embodiments disclosed herein. All or any portion of the method shown in FIG. 3 may be performed, for example, by a localization framework (e.g., the localization framework of FIG. 1).

While the various steps in the flowchart shown in FIG. 3 are presented and described sequentially, some or all of the steps may be executed in different orders, some or all of the steps may be combined or omitted, other steps not shown in FIG. 3 may additionally be performed, and/or some or all of the steps may be executed in parallel with other steps of FIG. 2 and/or FIG. 3.

In Step 300, the method includes notifying the cloud-based application provider and the translation service of the availability of the test build. As an example, the localization framework may notify the cloud-based application provider and the translation service that the test build is ready for validation once the test build is successfully deployed in the test environment, as discussed above in Step 214 and 216 of FIG. 2. The notification may be performed using any suitable technique for conveying information (e.g., over a network, as part of an email, via an update to the translation data repository, etc.). In one or more embodiments, the cloud-based application provider and the third-party translation service each have access to the test environment in which the test build of the cloud-based application is deployed.

In Step 302, the method includes making a determination as to whether a validation of the test build by the translation service passes. In one or more embodiments, the validation includes a visual inspection of the test build by the translation service, which is performed by accessing and using the test build. As an example, the visual inspection performed by the third-party translation service may include seeing the translated text in the context of how a user of the cloud-based application would see the translated text, and determine if the translation really says what the third-party translation service believes that it should say in that context.

In one or more embodiments, if the validation by the translation service fails, the method proceeds to Step 306. In one or more embodiments, if the validation by the translation service passes, the method proceeds to Step 304.

In Step 304, the method includes making a determination as to whether a validation of the test build by the cloud-based application provider passes. In one or more embodiments, the validation includes a visual inspection of the test build by the cloud-based application provider, which is performed by accessing and using the test build. As an example, the visual inspection performed by the cloud-based application provider may include seeing the translated text in the context of the cloud-based application, and determining whether the text seems to appear in the correct locations, is rendered appropriately, etc. In one or more embodiments, if the validation by the cloud-based application provider fails, the method proceeds to Step 306. In one or more embodiments, if the validation by the cloud-based application provider passes, the method proceeds to Step 308.

In Step 306, the method includes notifying the localization framework of the validation failure. The notification may be that one or both of the validations performed in Step 302 and Step 304 have failed. In one or more embodiments, how the localization framework responds to the notification depends on which one or more validations failed. In one or more embodiments, if the validation by the translation service failed, the localization service may request the translation service to re-perform all of any portion of the translation as needed to correct whatever issues caused the validation failure, and return to Step 206 of FIG. 2 to monitor for updates to the native language files while the updated translation is being performed. In one or more embodiments, if the validation by the cloud-based application provider failed, the localization service may provide a report to the translation service detailing the causes of the failure, request the translation service to re-perform all of any portion of the translation as needed to correct whatever issues caused the validation failure, and return to Step 206 of FIG. 2 to monitor for updates to the native language files while the updated translation is being performed. If both validations failed, all of the aforementioned actions may be performed.

In Step 308, the method includes generating and deploying a production build of the cloud-based application. As an example, the production build may be generated and deployed by the localization framework. In one or more embodiments, generating the production build may include incorporating the non-native language files into the cloud-based application. In one or more embodiments, the production build is deployed in a cloud infrastructure for access by users that may use the native language or any non-native language supported by the method set forth herein.

Figure 4:
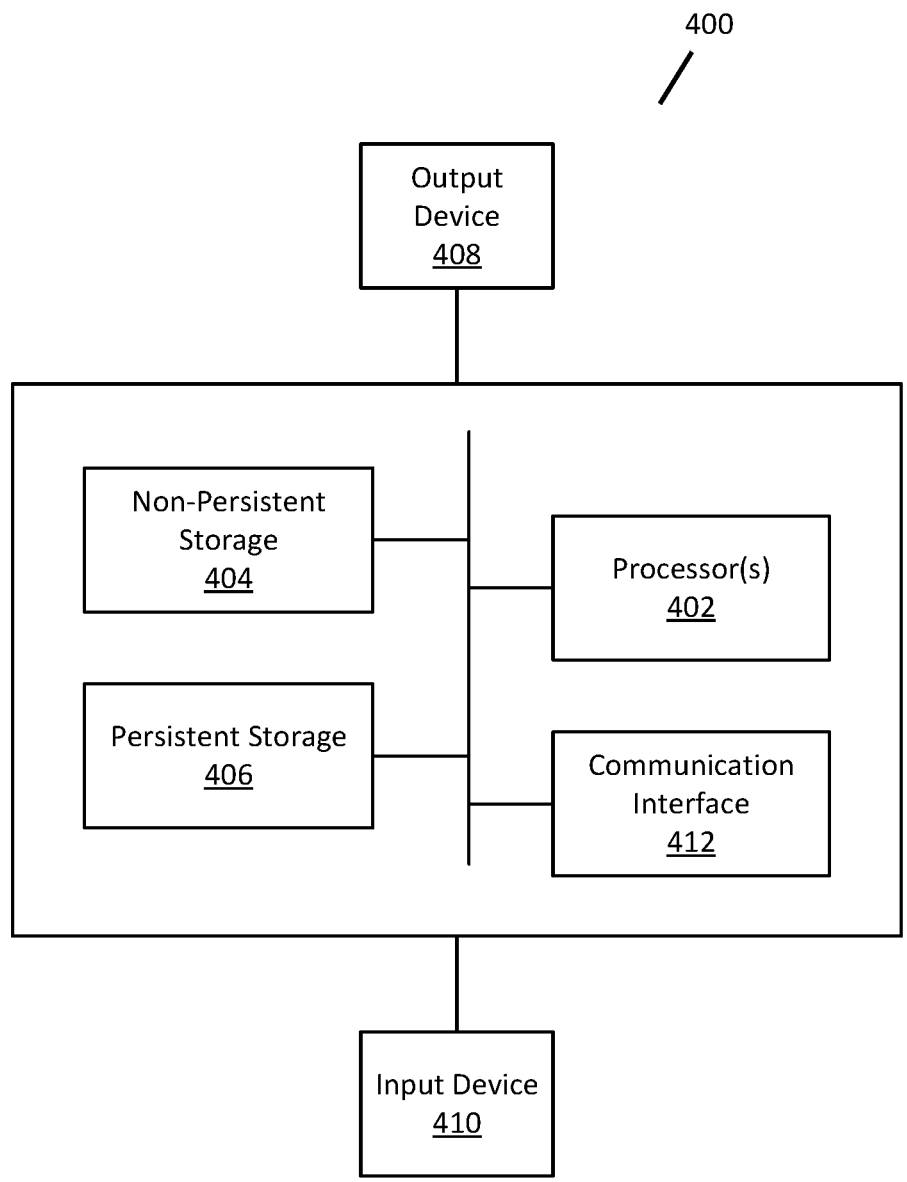
FIG. 4 illustrates a block diagram of a computing device, in accordance with one or more embodiments of this disclosure.

FIG. 4 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices, and all or any portion of the method shown in FIG. 2 and FIG. 3 may be performed using one or more computing devices, such as the computing device 400. The computing device 400 may include one or more computer processors 402, non-persistent storage 404 (e.g., volatile memory, such as random access memory (RAM), cache memory, etc.), persistent storage 406 (e.g., a hard disk, an optical drive such as a compact disk (CD) drive or digital versatile disk (DVD) drive, a flash memory, etc.), a communication interface 412 (e.g., Bluetooth interface, infrared interface, network interface, optical interface, etc.), input devices 410, output devices 408, and numerous other elements (not shown) and functionalities. Each of these components is described below.

In one or more embodiments, the computer processor(s) 402 may be an integrated circuit for processing instructions. For example, the computer processor(s) may be one or more cores or micro-cores of a processor. The processor 402 may be a general-purpose processor configured to execute program code included in software executing on the computing device 400. The processor 402 may be a special purpose processor where certain instructions are incorporated into the processor design. The processor 402 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs), etc.), etc. Although only one processor 402 is shown in FIG. 4, the computing device 400 may include any number of processors without departing from the scope of embodiments disclosed herein.

The computing device 400 may also include one or more input devices 410, such as a touchscreen, keyboard, mouse, microphone, touchpad, electronic pen, motion sensor, or any other type of input device. The input devices 410 may allow a user to interact with the computing device 400. In one or more embodiments, the computing device 400 may include one or more output devices 408, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 402, non-persistent storage 404, and persistent storage 406. Many different types of computing devices exist, and the aforementioned input and output device(s) may take other forms. In some instances, multimodal systems can allow a user to provide multiple types of input/output to communicate with the computing device 400.

Further, the communication interface 412 may facilitate connecting the computing device 400 to a network (not shown) (e.g., a local area network (LAN), a wide area network (WAN) such as the Internet, mobile network, or any other type of network) and/or to another device, such as another computing device. The communication interface 412 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 412 may also include one or more Global Navigation Satellite System (GNSS) receivers or transceivers that are used to determine a location of the computing device 400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 400 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of embodiments disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:

1. An apparatus, comprising:
   one or more processors; and
   one or more non-transitory computer readable media storing instructions which, when executed by the one or more processors, cause the one or more processors to:
   obtain, by a localization framework executing on the one or more processors, a cloud-based application;
   extract, by the localization framework, a plurality of native language files and a plurality of internationalization keys that correspond to the plurality of native language files from the cloud-based application;
   store, by the localization framework, the plurality of native language files and the plurality of internationalization keys in a translation data repository accessible by a translation service;
   detect, by the localization framework, a plurality of non-native language files corresponding to the plurality of native language files in the translation data repository;
   perform, by the localization framework, an initial check on the non-native language files, the initial check comprising comparing parameter counts of the plurality of native language files and the plurality of non-native language files to determine whether there is a parameter count match;
   generate, by the localization framework and when the initial check passes, a test build of the cloud-based application;
   deploy, by the localization framework, the test build to a test environment in a cloud infrastructure to have a first validation performed by the translation service and a second validation performed by a cloud-based application provider; and
   generate, by the localization framework and when the first validation and the second validation pass, a production build of the cloud-based application comprising the non-native language files.

2. The apparatus of claim 1, wherein execution of the instructions further causes the one or more processors, when the initial check fails, to send a notification of the failure to the translation service.

3. The apparatus of claim 1, wherein, to perform the initial check, execution of the instructions further causes the one or more processors to:
   perform a reserved word check using a reserved word file.

4. The apparatus of claim 1, wherein the plurality of non-native language files are provided to the translation data repository by the translation service in response to the plurality of native language files and the plurality of internationalization keys being stored on the translation data repository.

5. The apparatus of claim 1, wherein execution of the instructions further causes the one or more processors, before the detection of the plurality of non-native language files, to:
   detect an update to a native language file of the plurality of native language files; and
   replace the native language file with an updated native language file in the translation data repository.

6. The apparatus of claim 1, wherein execution of the instructions further causes the one or more processors, when the first validation fails, to request an updated translation from the translation service.

7. The apparatus of claim 1, wherein execution of the instructions further causes the one or more processors, when the second validation fails, to send to the translation service a report including details related to causes of the failure of the second validation.

8. A computer-implemented method, comprising:
   obtaining, by a localization framework executing on one or more processors, a cloud-based application;
   extracting, by the localization framework, a plurality of native language files and a plurality of internationalization keys that correspond to the plurality of native language files from the cloud-based application;
   storing, by the localization framework, the plurality of native language files and the plurality of internationalization keys in a translation data repository accessible by a translation service;
   detecting, by the localization framework, a plurality of non-native language files corresponding to the plurality of native language files in the translation data repository;
   performing, by the localization framework, an initial check on the non-native language files, the initial check comprising comparing parameter counts of the plurality of native language files and the plurality of non-native language files to determine whether there is a parameter count match;
   generating, by the localization framework and when the initial check passes, a test build of the cloud-based application;
   deploying, by the localization framework, the test build to a test environment in a cloud infrastructure to have a first validation performed by the translation service and a second validation performed by a cloud-based application provider; and
   generating, by the localization framework and when the first validation and the second validation pass, a production build of the cloud-based application comprising the non-native language files.

9. The computer-implemented method of claim 8, further comprising, when the initial check fails, sending a notification of the failure to the translation service.

10. The computer-implemented method of claim 8, wherein the initial check comprises:
performing a reserved word check using a reserved word file.

11. The computer-implemented method of claim 8, wherein the plurality of non-native language files are provided to the translation data repository by the translation service in response to the plurality of native language files and the plurality of internationalization keys being stored on the translation data repository.

12. The computer-implemented method of claim 8, further comprising, before the detection of the plurality of non-native language files:
detecting an update to a native language file of the plurality of native language files; and
replacing the native language file with an updated native language file in the translation data repository.

13. The computer-implemented method of claim 8, further comprising, when the first validation fails, requesting an updated translation from the translation service.

14. The computer-implemented method of claim 8, further comprising, when the second validation fails, sending to the translation service a report including details related to causes of the failure of the second validation.

15. A non-transitory computer-readable medium storing programming for execution by one or more processors, the programming comprising instructions to:
obtain, by a localization framework executing on the one or more processors, a cloud-based application;
extract, by the localization framework, a plurality of native language files and a plurality of internationalization keys that correspond to the plurality of native language files from the cloud-based application;
store, by the localization framework, the plurality of native language files and the plurality of internationalization keys in a translation data repository accessible by a translation service;
detect, by the localization framework, a plurality of non-native language files corresponding to the plurality of native language files in the translation data repository;
perform, by the localization framework, an initial check on the non-native language files, the initial check comprising comparing parameter counts of the plurality of native language files and the plurality of non-native language files to determine whether there is a parameter count match;
generate, by the localization framework and when the initial check passes, a test build of the cloud-based application;
deploy, by the localization framework, the test build to a test environment in a cloud infrastructure to have a first validation performed by the translation service and a second validation performed by a cloud-based application provider; and
generate, by the localization framework and when the first validation and the second validation pass, a production build of the cloud-based application comprising the non-native language files.

16. The non-transitory computer-readable medium of claim 15, comprising further instructions that, when executed by the one or more processors, cause the one or more processors, when the initial check fails, to send a notification of the failure to the translation service.

17. The non-transitory computer-readable medium of claim 15, wherein, to perform the initial check, execution of the instructions further causes the one or more processors to:
perform a reserved word check using a reserved word file.

18. The non-transitory computer-readable medium of claim 15, wherein the plurality of non-native language files are provided to the translation data repository by the translation service in response to the plurality of native language files and the plurality of internationalization keys being stored on the translation data repository.

19. The non-transitory computer-readable medium of claim 15, comprising further instructions that, when executed by the one or more processors, before the detection of the plurality of non-native language files, to:
detect an update to a native language file of the plurality of native language files; and
replace the native language file with an updated native language file in the translation data repository.

20. The non-transitory computer-readable medium of claim 15, comprising further instructions that, when executed by the one or more processors to:
when the first validation fails, request an updated translation from the translation service; and
when the second validation fails, send to the translation service a report including details related to causes of the failure of the second validation.

* * * * *